Aug. 10, 1954

H. D. PETRI 2,685,720

FASTENING DEVICE

Filed Dec. 19, 1950

INVENTOR:
HECTOR D. PETRI,
By Robert E Ross
AGENT.

Patented Aug. 10, 1954

2,685,720

UNITED STATES PATENT OFFICE 2,685,720

FASTENING DEVICE

Hector D. Petri, Framingham, Mass., assignor to United-Carr Fastener Corporation, Cambridge, Mass., a corporation of Massachusetts Application December 19, 1950, Serial No. 201,607

1 Claim. (Cl. 24—73)

This invention relates generally to fastening devices, and has particular reference to a sheet metal fastener which is adapted for engagement with a wire or the like.

In certain mechanical assemblies, it is frequently desirable to attach a wire to an operating member of a mechanism, so that a pull applied to the wire will be transmitted to the operating member. In many cases, it is also desirable that the assembly be so arranged that the wire be able to transmit a certain amount of pushing force to the operating member, in which case the wire is made relatively thick in relation to its length, or is encased in a suitable housing throughout its length. In either case, some means must be provided for attaching the wire to the operating member so that slippage of the wire relative thereto is prevented. Devices used heretofore for such applications have not been entirely satisfactory, since such devices commonly comprise a number of individual parts which must be assembled during attachment of the wire to the operating member, thereby increasing the cost of the completed assembly. Such devices have also been subject to loosening in service so as to allow slippage of the wire in the fastening device.

The object of the invention is to provide a fastener for assembly onto a wire for gripping engagement therewith to transmit push and pull motion applied to the wire to an operating member of a mechanism.

A further object of the invention is to provide a fastener for assembly onto the end of a wire in which a pair of diverging arms having openings for receiving the wire are provided with means actuated by closing of the arms to engage a portion of the wire disposed therebetween.

A still further object of the invention is to provide a sheet metal fastener of this general type which is adapted for rapid assembly into gripping engagement with a wire without substantial deformation of the wire.

A still further object of the invention is to provide a one-piece fastener as set forth above which is adapted for attachment to both a wire and an operating member of a mechanism in which the wire is utilized for locking the fastener into assembly with the operating member.

Other objects of the invention will, in part, be obvious, and will, in part, appear hereinafter.

In the drawing:

Fig. 2 is a view in elevation, partly in section, of the fastening device of Fig. 1 assembled onto an operating member of a mechanism, illustrating one step in attaching the fastener to a wire or the like;

Figure 1:
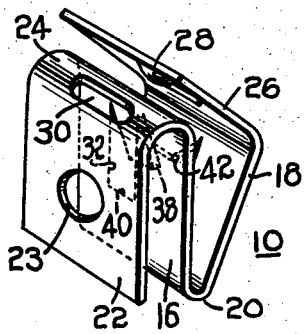
Fig. 1 is a perspective view of a fastening device embodying the features of the invention.

Referring to the drawing, there is illustrated a fastener 10, which is adapted for assembly onto the end of a wire 12, to enable the wire to be attached to an operating member 14 of a mechanism which is to be operated by push or pull forces applied to the wire.

The fastener 10 is preferably formed of a single piece of sheet metal and comprises generally a pair of arms 16 and 18 which extend generally in the same direction from a flexible junction 20 and diverge slightly from each other. An attaching portion 22 having an opening 23 is provided for attaching the fastener to the operating member 14 of a mechanism and the attaching member, in the illustrated embodiment, extends alongside the arm 16 in spaced relation thereto, and is connected to the arm 18 at the end opposite the junction 20 by a reverse bend portion 24.

The arms 16 and 18 are adapted for movement toward and away from each other, and to retain the arms in the closed position after they have been moved together, the arm 18 is provided with a bent end portion 26 which extends generally toward the plane of the arm 16, and a depending hook member 28 is provided on the bent end portion 26 for engagement in an opening 30 in the reverse bend portion. The bent end portion 26 is disposed at such an angle to the arm 18 to which it is attached that when the arms are moved together, the hook member 28 rides up the adjacent side of the reverse bend portion 26, flexing the bent end portion slightly outwardly, so that when the hook passes the edge of the opening, it snaps downwardly into the opening and locks behind the edge thereof.

The arms 16 and 18 are provided with openings 32 and 34 respectively, which are disposed in the medial portion of the arms opposite one another to receive the wire 12, so that the wire may be passed through the openings to extend between the arms. To provide means for gripping engagement with the wire, a tongue 36 is provided on the arm 16 which is formed from the metal of the arm, and is disposed on the side of the arm which is adjacent the opposite arm 18. The tongue 36 is attached to the arm adjacent the opening 32, and extends in spaced relation to the plane of the arm downwardly toward the junction 20 terminating in a free end 38 which is normally spaced out of alignment with the openings 32 and 34, so that the wire may be passed therethrough without interference by the tongue. The tongue is flexible toward and away from the plane of the arm 16 about the junction with the arm, so that when the tongue is flexed toward the arm, the distance between the free end 38 and the opposite edge 40 of the opening decreases, thereby partially restricting the opening 32. To provide means for actuating the wire-gripping tongue, a projecting tab 42 is provided on the arm 18, which is formed from the metal of the arm and extends generally toward the opposite arm 16. The tab 42 is so spaced on the arm 18 that when the arms are moved into the closed position, the tab 42 contacts the tongue 36 near the end thereof to force the tongue toward the plane of the arm 16.

Figure 2:
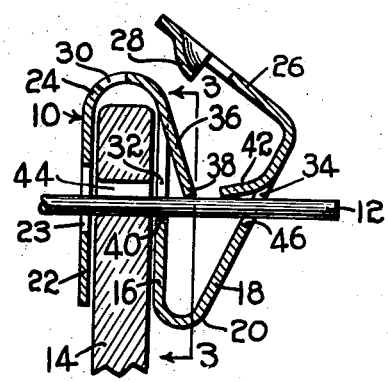
Figure 4:
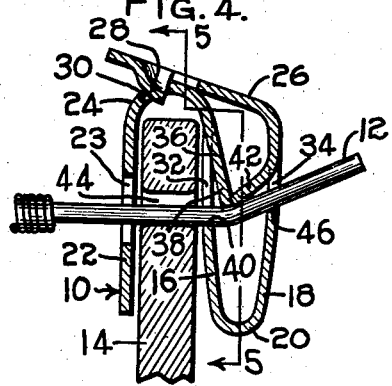
Fig. 4 is a view similar to Fig. 2 in which the fastener has been closed to engage the wire.
Figure 3:
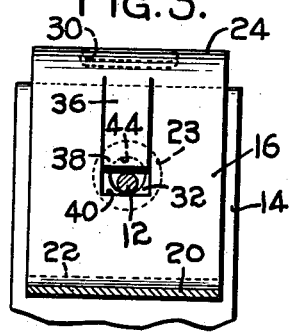
Fig. 3 is a view in section taken on line 3—3 of Fig. 2.
Figure 5:
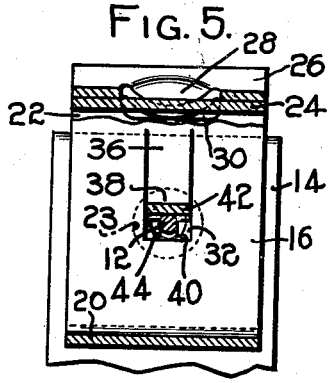
Fig. 5 is a view in section taken on line 5—5 of Fig. 4.
Figure 6:
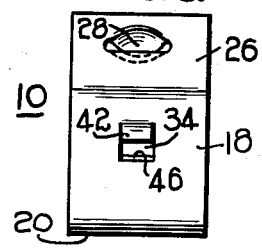
Fig. 6 is a view in elevation of the fastener of Fig. 1.

To assemble the fastener 10 onto the wire and the operating member 14, the fastener is placed over the edge of the operating member so that the attaching portion 22 and the arm 16 are disposed on opposite sides thereof. The opening 23 in the attaching portion and the opening 32 in the arm are aligned with an opening 44 in the operating member, and the end of the wire 12 is then passed through the openings 23 in the attaching portion, the opening 44 in the operating member, and the openings 32 and 34 in the arms (see Fig. 2). The arms are then forced together, so that the hook 28 engages in the opening 30 in the reverse bend portion and retains the arms in the closed position (see Fig. 4). As the arms come together, the tab 42 engages the tongue 36 and flexes it toward the plane of the arm 16, so that the end of the tongue contacts the wire. As the tab 42 forces the tongue further inwardly, the wire is gripped firmly between the end of the tongue and the opposite edge 40 of the opening. If the wire is sufficiently rigid, it will also be forced firmly against the lower edge 46 of the opening 34, to increase the frictional engagement of the fastener with the wire.

When the fastener is in the open position, the arm 18 diverges from the plane of the arm 16; consequently, as the arms are moved together, the distance from the end of the tongue 36 to a line connecting the lower edge of the openings 32 and 34 decreases, or, in other words, the lower edge 46 of the opening 34 moves upwardly in relation to the end of the tongue 36 as the arms are moved together. Consequently, as the arms are closed when the wire is assembled therein, the portion of the wire between the opening 34 and the tongue is bent upwardly, which tends to increase the frictional engagement of the wire with both the tongue and the edge 46 of the opening 34, and the wire is thereby firmly held by the fastener against longitudinal movement therein.

The portion of the wire extending through the openings in the attaching portion and the operating member retains the fastener in assembly with the operating member without the use of any auxiliary parts, and push or pull movement applied to the wire is transmitted through the fastener to the operating member.

The construction of the fastener allows rapid adjustment of the wire therein, merely by releasing the hook 28 so that the arms 16 and 18 spring apart, thereby releasing the gripping engagement of the tongue 36 and the lower edge 46 of the opening 34. Thereafter the wire may be easily moved longitudinally to a desired position, and the fastener may then be engaged with the wire as hereinbefore described.

The fastener 10 may be rapidly and economically provided on automatic machinery from a continuous strip of sheet metal, and is particularly adapted for use in assembly line production of automobiles and the like.

Since certain obvious modifications may be made in the device without departing from the scope of the invention, it is intended that all matter contained herein be interpreted in an illustrative and not in a limiting sense.

I claim:

A fastening device for assembly onto a wire or the like, comprising a pair of arms joined at one end and extending generally in the same direction, one arm having a bent end portion which extends generally toward the plane of the other arm, said bent end portion having means thereon for engaging said other arm when the arms are moved together to retain the arms in a closed position, said arms having opposed openings in the medial portion, and opposed projecting tongues formed therefrom, one of said projecting tongues being deformable into a wire-engaging position by movement toward the plane of the arm to which it is attached, the other projecting tongue being disposed for engagement with said one projecting tongue to deform it into a wire-engaging position when said arms are moved into the closed position.

References Cited in the file of this patent

UNITED STATES PATENTS

| Number | Name | Date |
|---|---|---|
| 814,084 | Rypinski | Mar. 6, 1906 |
| 823,068 | Mosley | June 12, 1906 |
| 1,152,892 | Henry | Sept. 7, 1915 |
| 2,566,886 | Hartman | Sept. 4, 1951 |